(12) United States Patent
Ma et al.

(10) Patent No.: US 10,661,153 B2
(45) Date of Patent: May 26, 2020

(54) COMPACTABLE FOOT-DECK-BASED VEHICLE

(71) Applicant: KOOFY INNOVATION LIMITED, Central, Sheung Wan (CN)

(72) Inventors: Ondy Song Qi Ma, Hong Kong (CN); Xiaodong Ge, Shenzhen (CN)

(73) Assignee: KOOFY INNOVATION LIMITED, Hong Kong (CN)

( * ) Notice: Subject to any disclaimer, the term of this patent is extended or adjusted under 35 U.S.C. 154(b) by 0 days.

(21) Appl. No.: 15/976,355

(22) Filed: May 10, 2018

(65) Prior Publication Data

US 2018/0326294 A1   Nov. 15, 2018

Related U.S. Application Data

(60) Provisional application No. 62/506,035, filed on May 15, 2017.

(51) Int. Cl.
| | | |
|---|---|---|
| *A63C 17/12* | (2006.01) | |
| *B62K 11/00* | (2006.01) | |
| *A63C 17/01* | (2006.01) | |
| *B62K 15/00* | (2006.01) | |
| *B62K 1/00* | (2006.01) | |
| *G05D 1/08* | (2006.01) | |

(52) U.S. Cl.
CPC ............ *A63C 17/12* (2013.01); *A63C 17/014* (2013.01); *B62K 1/00* (2013.01); *B62K 11/007* (2016.11); *B62K 15/006* (2013.01); *A63C 2203/10* (2013.01); *A63C 2203/42* (2013.01); *A63C 2203/44* (2013.01); *G05D 1/0891* (2013.01)

(58) Field of Classification Search
CPC ....... A63C 17/12; A63C 17/014; A63C 17/08; A63C 2203/10; A63C 2203/44; B62K 11/007
See application file for complete search history.

(56) References Cited

U.S. PATENT DOCUMENTS

| | | | | |
|---|---|---|---|---|
| 4,129,315 A | * | 12/1978 | McCallum | A63C 17/01 280/81.1 |
| 6,131,931 A | * | 10/2000 | Globerson | A63C 17/01 280/20 |
| 2003/0127816 A1 | * | 7/2003 | Schnuckle | A63C 11/023 280/87.042 |

(Continued)

OTHER PUBLICATIONS

Seth, Sarang, "What Hoverboards Were Meant to Be", Yanko Design, www.yankodesign.com/2018/01/05/what-hoverboards-were-meant-to-be/, Jan. 5, 2018.

*Primary Examiner* — Frank B Vanaman
(74) *Attorney, Agent, or Firm* — Millman IP Inc.

(57) ABSTRACT

A foot-deck-based vehicle includes a support structure having a longitudinal axis, a first foot-deck portion, and a second foot-deck portion. Each of the first foot-deck portion and the second foot-deck portion have a foot support surface. The foot support surfaces of the first and second foot-deck portions are positioned to support first and second feet of a rider respectively. The foot-deck-based vehicle further includes at least one wheel that is rotationally connected to the support structure for rotation about a lateral axis. The first and second foot-deck portions are movably connected at least indirectly to each other and are movable between a use position and a stowage position.

11 Claims, 5 Drawing Sheets

(56) References Cited

U.S. PATENT DOCUMENTS

| | | | | |
|---|---|---|---|---|
| 2005/0092533 A1* | 5/2005 | Ishii | ......................... | B60K 1/02 |
| | | | | 180/65.1 |
| 2007/0254789 A1* | 11/2007 | Odien | ................ | A63B 21/0058 |
| | | | | 482/146 |
| 2011/0295454 A1* | 12/2011 | Meyers | .................... | B62J 17/00 |
| | | | | 701/22 |
| 2014/0138937 A1* | 5/2014 | Woncik | .............. | A63C 17/0006 |
| | | | | 280/639 |
| 2016/0114242 A1* | 4/2016 | Riley | .................. | A63C 17/012 |
| | | | | 180/233 |
| 2016/0136508 A1* | 5/2016 | Bigler | ................. | A63C 17/014 |
| | | | | 180/181 |

* cited by examiner

COMPACTABLE FOOT-DECK-BASED VEHICLE

CROSS-REFERENCE TO RELATED APPLICATIONS

This application claims the benefit of U.S. Provisional Application No. 62/506,035, filed May 15, 2017, the contents of which are incorporated herein by reference in their entirety.

FIELD

The disclosure relates generally to a personal transport apparatus, and in particular, to a compactable foot-deck-based vehicle.

BACKGROUND OF THE DISCLOSURE

One-wheeled skateboards have become quite popular with teens and young adults. It is not always convenient for a rider to carry a one-wheeled skateboard in his/her arms when the skateboard is not in use. Additionally, such skateboards can occupy more space than is desired when being stored.

SUMMARY OF THE DISCLOSURE

In an aspect, there is provided a foot-deck-based vehicle, comprising: a support structure having a longitudinal axis, a first foot-deck portion, and a second foot-deck portion, each of the first foot-deck portion and the second foot-deck portion having a foot support surface; and at least one primary wheel rotationally connected to the support structure for rotation about a lateral axis, wherein the first and second foot-deck portions are movably connected at least indirectly to each other and are movable between a use position and a stowage position, wherein in the use position, the first and second foot-deck portions are positioned longitudinally forward and rearward of the at least one primary wheel respectively, with the foot support surfaces of the first and second foot-deck portions being oriented to support first and second feet respectively of a rider thereon, and in the stowage position, the foot support surface of the first foot-deck portion is closer to the foot support surface of the second foot-deck portion are closer to one another than when the first and second foot-deck portions are in the use position.

The foot-deck-based vehicle can further include a handle aperture on at least one of the first and second foot-deck portions, wherein the handle aperture is positioned to be graspable by a user for carrying the vehicle when the first and second foot-deck portions are in the stowage position.

The first and second foot-deck portions can be pivotally connected at least indirectly to each other and can be pivotable between the use position and the stowage position. Both the first and second foot-deck portions can pivot about a single pivot axis relative to each other.

The support structure can include at least one axial member that is parallel to the lateral axis, wherein each of the first and second foot-deck portions has two arms that are pivotally coupled to the at least one axial member.

The first and second foot-deck portions can each have two arms that extend to couple to the at least one axial member, wherein a first one of the arms from the first foot-deck portion couples to the at least one axial member laterally outside a first one of the arms from the second foot-deck portion, and wherein a second one of the arms from the first foot-deck portion couples to the at least one axial member laterally inside a second one of the arms from the second foot-deck portion.

The foot-deck-based vehicle can further comprising a motor that is operatively connected to the at least one primary wheel, and a control system that is operatively connected to the motor to drive the at least one primary wheel to maintain the vehicle in balance with a rider on board.

In the stowage position, the foot support surfaces of the first and second foot-deck portions can face one another.

The support structure can further include a support structure base pivotally coupled to at least one of the first and second foot-deck portions. Both the first and second foot-deck portions can be pivotable relative to the support structure base. In the use position, further pivoting of the foot support surface of the first foot-deck portion away from the foot support surface of the second foot-deck portion can be limited by abutment of the first foot-deck portion with at least one of the second foot-deck portion and the support structure base.

In another aspect, a foot-deck-based vehicle is provided. The foot-deck-based vehicle includes a support structure having a longitudinal axis, and having a first foot-deck portion and a second foot-deck portion. The surfaces of the first and second foot-deck portions are positioned to support first and second feet of a rider respectively. The foot-deck-based vehicle further includes at least one wheel that is generally longitudinally centrally positioned relative to the support structure and is rotationally connected to the support structure for rotation about a lateral axis. The first and second foot-deck portions of the support structure are movably connected at least indirectly to each other and are movable between a use position and a stowage position. In the use position, the first and second foot-deck portions are positioned on a front side and a rear side of the wheel respectively, and the surfaces of the first and second foot-deck portions face in a common direction for receiving a first and second feet of the rider. While in the stowage position, the first and second foot-deck portions are both on one of the front and rear sides of the wheel, or the first and second foot-deck portions in close proximity to each other at any positions between the front and rear sides of the wheel.

In a further aspect, a foot-deck-based vehicle is provided, and includes a support structure having a longitudinal axis, and having a first foot-deck portion and a second foot-deck portion, and at least one primary wheel that is generally longitudinally centrally positioned relative to the support structure and is rotationally connected to the support structure for rotation about a lateral axis. The first and second foot-deck portions are movably connected at least indirectly to each other and are movable between a use position and a stowage position. In the use position the first and second foot-deck portions are positioned forward and rearward of the wheel respectively, and face in a common direction for receiving the first and second feet of the rider, and in the stowage position, the foot support surface of the first foot-deck portion is closer to the foot support surface of the second foot-deck portion are closer to one another than when the first and second foot-deck portions are in the use position.

BRIEF DESCRIPTIONS OF THE DRAWINGS

For a better understanding of the various embodiments described herein and to show more clearly how they may be carried into effect, reference will now be made, by way of example only, to the accompanying drawings in which.

DETAILED DESCRIPTION

For simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Figure 1:
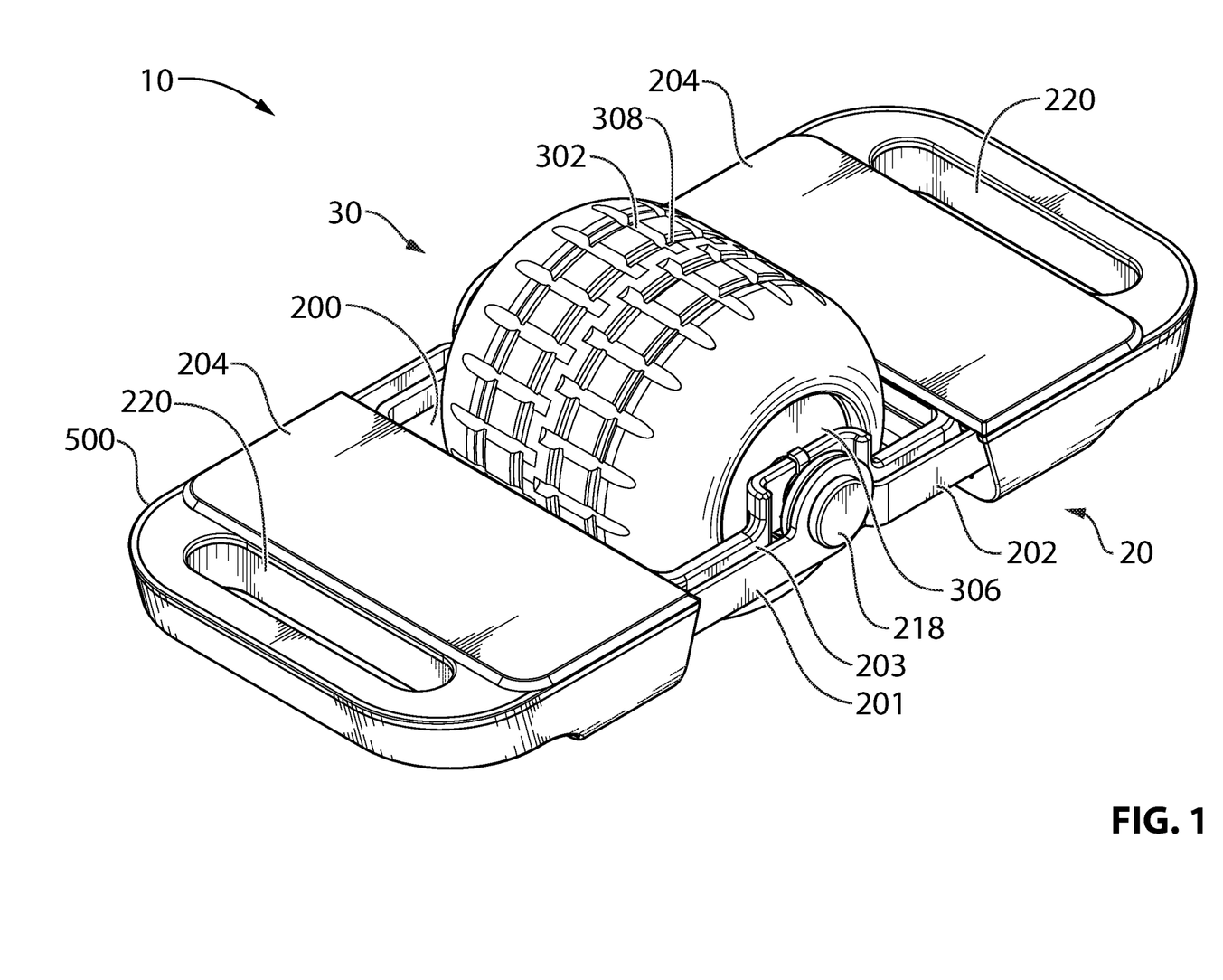
FIG. 1 is a perspective view of a foot-deck-based vehicle in accordance with an embodiment of the present disclosure, wherein foot-deck portions thereof are in a use position.
Figure 2:
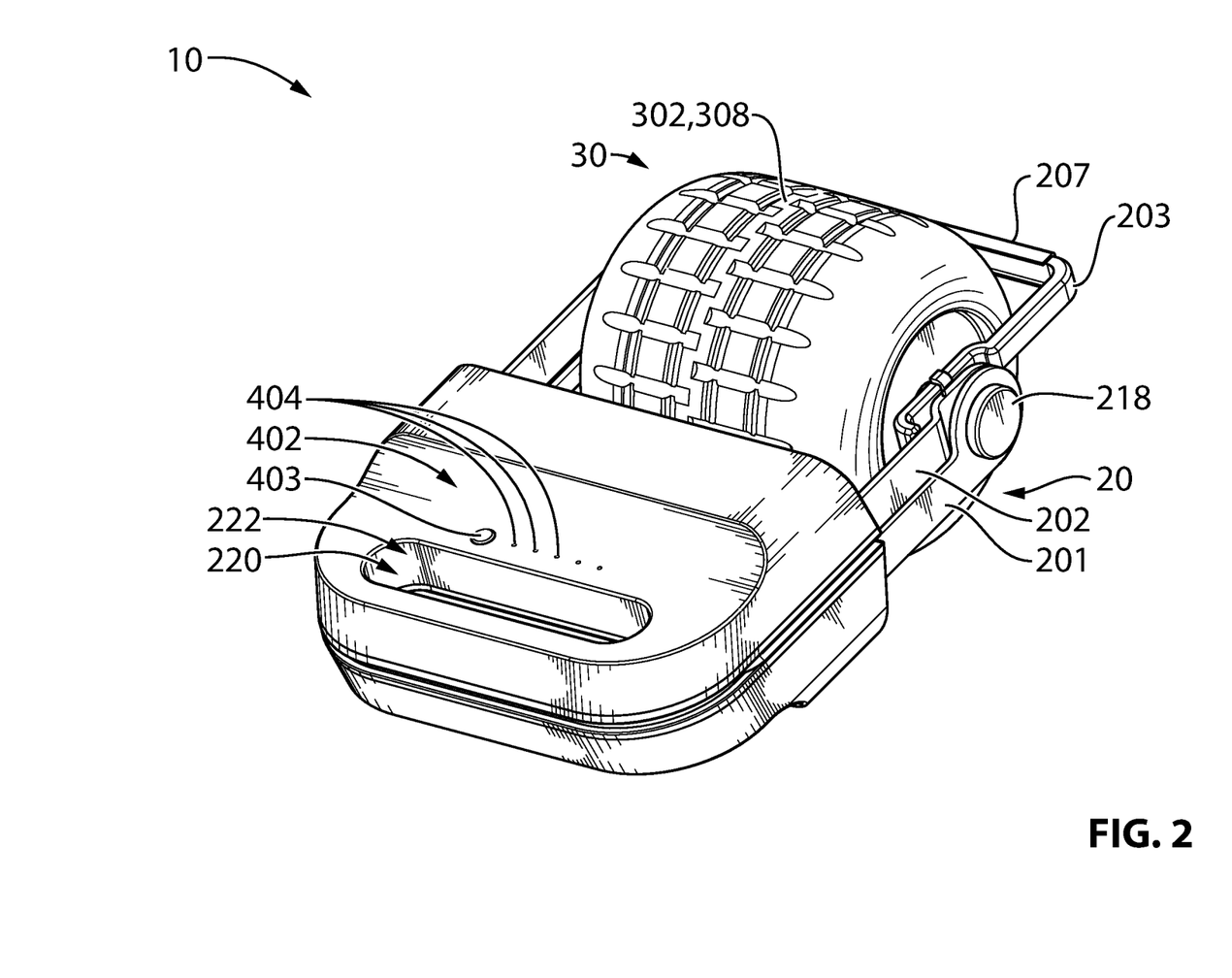
FIG. 2 is a perspective view of the foot-deck-based vehicle shown in FIG. 1, wherein the foot-deck portions are in a stowage position.
Figure 3:
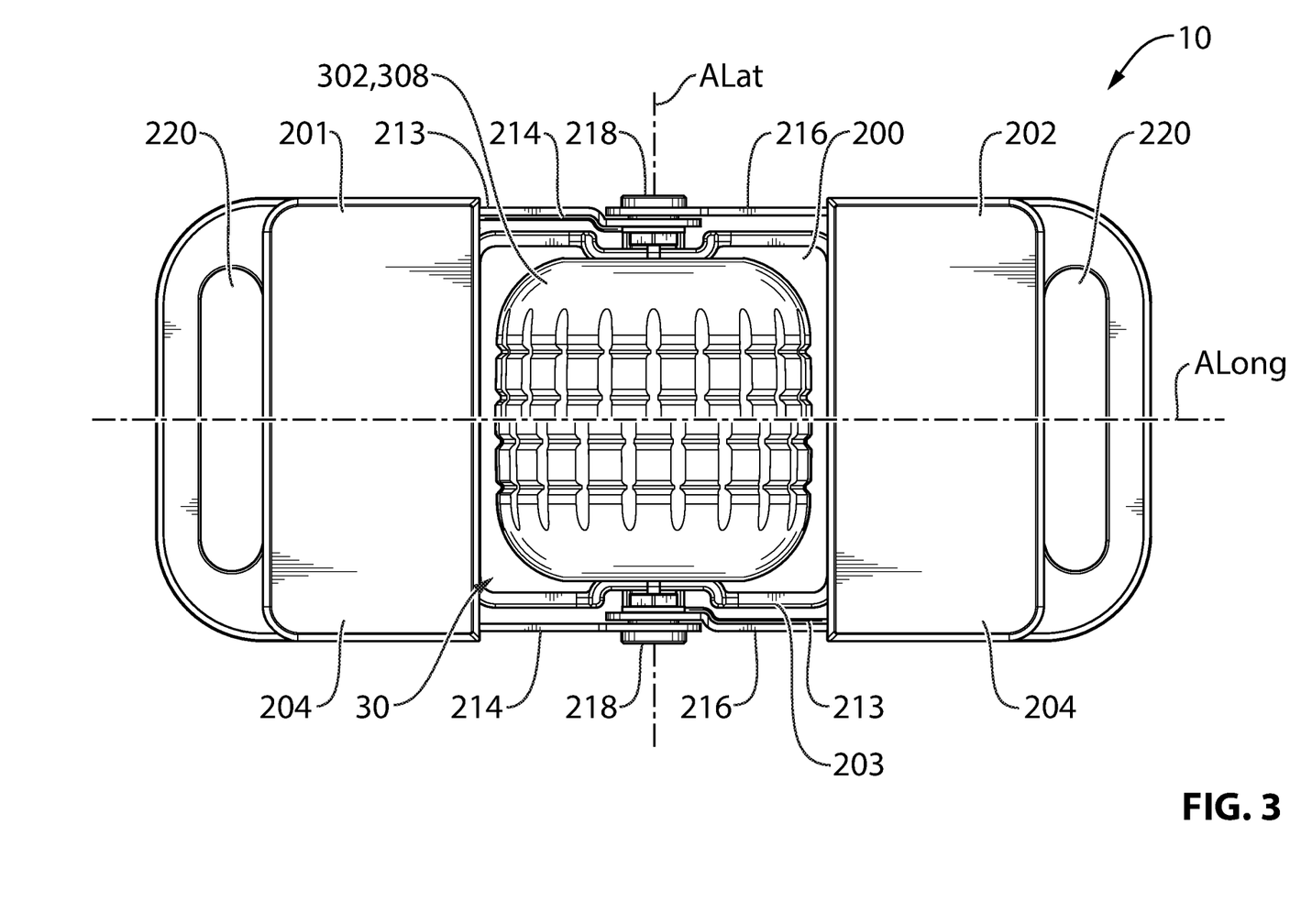
FIG. 3 is a plan view of the foot-deck-based vehicle shown in FIG. 1, wherein the foot-deck portions are in a use position.
Figure 4:
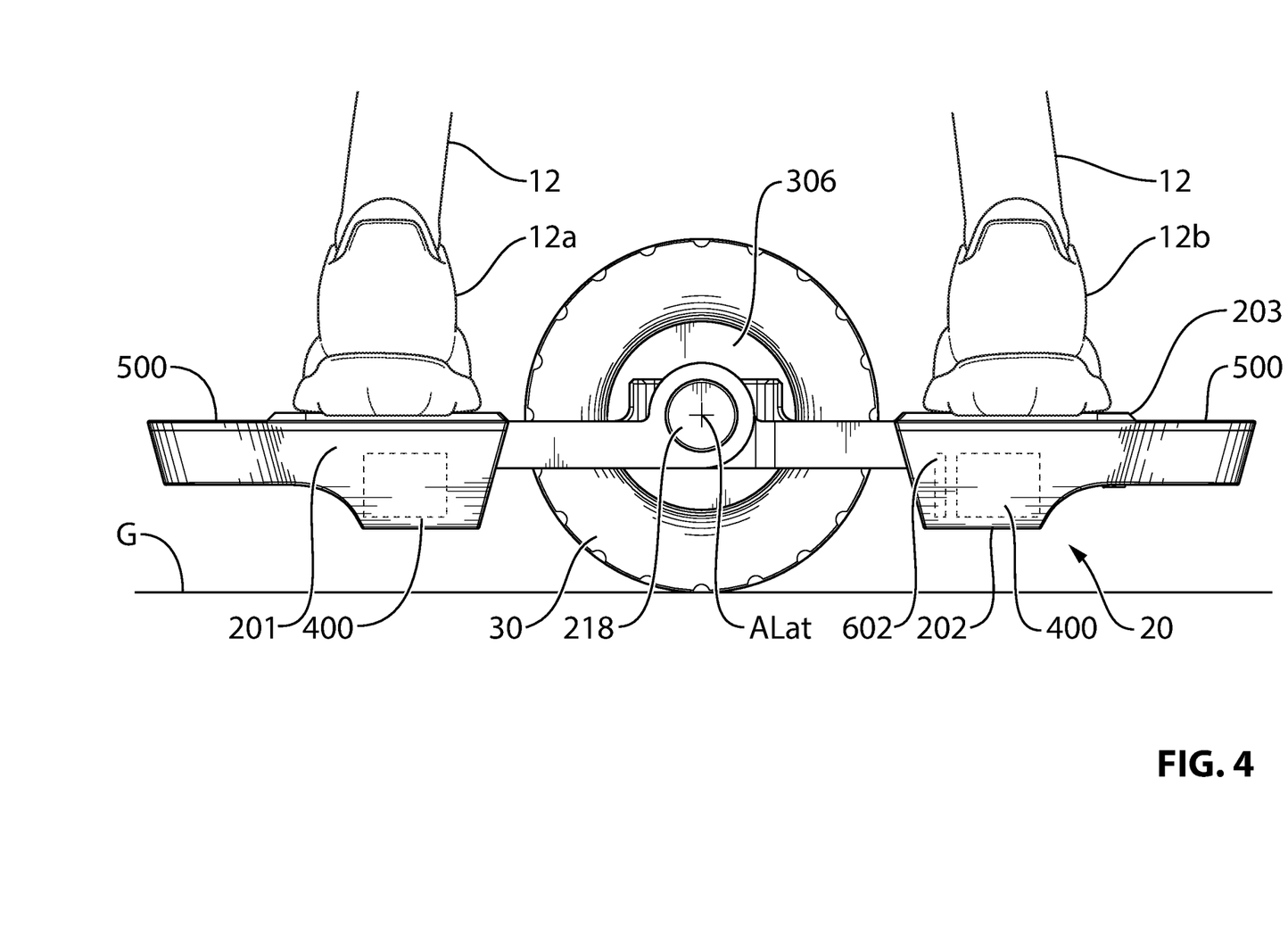
FIG. 4 is a side elevation view of the foot-deck-based vehicle shown in FIG. 1, wherein the foot-deck portions are in a use position.
Figure 5:
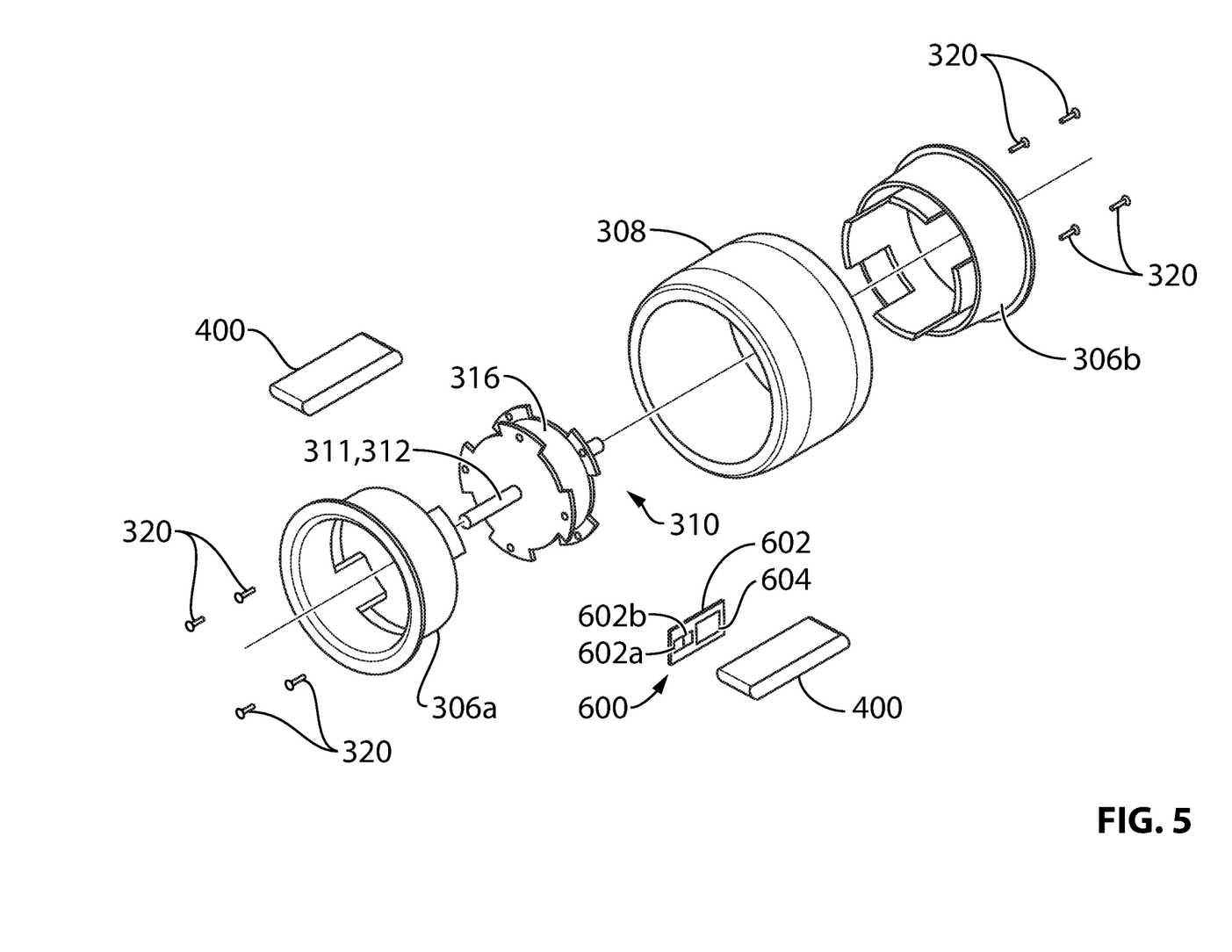
FIG. 5 is an exploded view of a portion of a wheel assembly from the foot-deck-based vehicle shown in FIG. 1.

Reference is made to FIGS. 1 and 2 which show a compactable foot-deck-based vehicle 10 (which may also be referred to simply as the vehicle 10, for ease of readability). The foot-deck-based vehicle 10 may be a self-balancing vehicle, such as an electrically powered one-wheel self-balancing skateboard, and may be movable between a use configuration, shown in FIG. 1, and a stowage configuration, shown in FIG. 2. In the use configuration, the vehicle 10 may be ridden by a rider 12 as shown in FIG. 4. In the stowage configuration, the vehicle 10 may be relatively smaller in at least one dimension than in the use configuration and thus may be more manageably carried by a user. The vehicle 10 is described as follows.

FIGS. 1 to 5 show the vehicle 10 having a support structure 20 and a primary wheel assembly 30. The vehicle 10 has a longitudinal axis ALong, defined by the direction of travel of the vehicle 10, and a lateral axis ALat which is transverse to the longitudinal axis ALong. The support structure 20 includes a first foot-deck portion 201, a second foot-deck portion 202, and a support structure base 203. Each foot-deck portion 201, 202 has a foot support surface 204 thereon that is oriented facing upwards when the vehicle 10 is being ridden, in order to support the feet (shown at 12a and 12b in FIG. 2) of the rider 12 during use.

The first and second foot-deck portions 201 and 202 are movably connected to each other at least indirectly, for movement between a use position and a stowage position, which correspond to the use and stowage configurations of the vehicle 10. In the example shown, each of the foot-deck portions 201 and 202 are pivotable relative to the support structure base 203 via a pair of axial members in the form of pins 218 that pass through apertures (not shown) in two arms 214 and 216 that extend out from the foot-deck portions 201 and 202 respectively. While, in the illustrated embodiment, the foot-deck portions 201, 202 pivot about a single pivot axis defined by the pins 218 that is coaxial with the lateral axis ALat, the foot-deck portions 201, 202 can pivot about other axes that are parallel to the lateral axis ALat. Further, the foot-deck portions 201, 202 can pivot about separate pivot axes in other embodiments.

In the example shown, a first one of the arms 214 is laterally outside of a first one of the arms 216 on one lateral side of the wheel assembly 30, while, on the other lateral side of the wheel assembly, a second one of the arms 214 is laterally inside a second one of the arms 216. This permits at least some parts of the foot-deck portions 201 and 202 to be identical, thereby reducing the number of different components that are involved in manufacturing the vehicle 10.

When the foot-deck portions 201, 202 are in the use position, they are positioned longitudinally forward or rearward of the wheel assembly 30. Each foot-deck portion 201, 202 is supported on a corresponding one of two foot-deck portion support surfaces 207 on the support structure base 203.

Further pivoting of the foot support surface 204 of the first foot-deck portion 201 away from the foot support surface 204 of the second foot-deck portion 202 is limited by abutment of the first foot-deck portion 201 with at least one of the second foot-deck portion 202 and the support structure base 203. In the illustrated embodiment, the support structure base 203 acts as a support for limiting pivoting of the foot support surfaces 204 of the foot-deck portions 201, 202 away from each other via abutment of the foot-deck portions 201, 202 with foot-deck portion support surfaces 207, thereby maintaining the foot support surfaces 204 of the foot-deck portions 201, 202 generally co-planar when the foot-deck portions are in the use position. In the embodiment shown in the figures, both foot-deck portions 201 and 202 are movable relative to the support structure base 203 so that either of the first or second foot-deck portions 201 and 202 may be lifted off the corresponding support surface 207 and folded over onto the other of the first and second foot-deck portions 201 and 202. In some alternative embodiments, however, the support structure base 203 may be integrally incorporated within one of the first and second foot-deck portions 201 and 202, such that the said one of the first and second foot-deck portions 201 and 202 cannot separate from it, while the other of the first and second foot-deck portions 201 and 202 could still move relative to it between a use position and a stowage position. For example, the support structure base 203 could be incorporated integrally as part of the first foot-deck portion 201 so that the foot-deck portion 201 is fixedly connected with the support structure base 203, while the second foot-deck portion 202 can pivot between a use position in which the second foot-deck portion 202 is supported on the support surface 207 of the base, and a stowage position in which the foot support surface of the first foot-deck portion is closer to the foot support surface of the second foot-deck portion are closer to one another than when the first and second foot-deck portions are in the use position. In the example shown, in the stowage position the first and second foot-deck portions 201 and 202 face one another. In other embodiments, the foot-deck portions can be provided with abutment surfaces that limit their pivoting relative to one another.

At least one of the first and second foot-deck portions 201 and 202 has a handle aperture 220 that is used as a handle that is graspable by a user for picking up the vehicle 10 when the first and second foot-deck portions 201 and 202 are in the stowage position. In the example shown, both the first and second foot-deck portions 201 and 202 have handle apertures, which pass through the respective foot-deck portions 201 and 202 and which are aligned with one another to form a handle 222.

The primary wheel assembly 30 is supported by the support structure 20 and is positioned in an opening 200 that is present in the support structure 20. The primary wheel assembly 30 includes at least one primary wheel 302 positioned in the opening 200. In the example shown, there is a single primary wheel 302. The primary wheel 302 is generally longitudinally centrally positioned relative to the support structure 20 when the first and second foot-deck portions 201 and 202 are in the use position, and is rotationally connected to the support structure 20 for rotation about the lateral axis ALat. In embodiments in which a plurality of primary wheels 302 is provided, the plurality of wheels 302 may all rotate about the lateral axis ALat. In other words, the lateral axis ALat would be common to all of the plurality of primary wheels 302.

The primary wheel 302 includes a wheel hub 306 which may be formed from two mating wheel hub portions 306a and 306b, and a tire 308 that is supported on the wheel hub 306.

A motor 310 is used for driving the primary wheel 302. The motor 310 may be operatively connected to the primary wheel 302 by any suitable structure. For example, the stator 311 of the motor 310 may include the motor shaft, which is shown at 312. The motor shaft 312 is connected to the support structure 20. In the example shown, the motor shaft 312 is fixedly connected to the support structure base 203. The rotor of the motor 310 is shown at 316 and may be radially outside the stator and rotatably supported on the motor shaft 312. The rotor 316 has the wheel hub 306 mounted to it (e.g., via threaded fasteners shown at 320). The rotor 316 may be rotatably mounted to the shaft 312 via a plurality of bearings (not shown).

The vehicle 10 includes one or more battery packs 400 for supplying power to the motor 310. In the example shown, one battery pack 400 is provided in each foot-deck portion 201 and 202. An electrical conduit 213 may extend from each battery pack 400 along one arm 214, 216 to the motor shaft 312. The electrical conduit 213 may extend into the motor shaft 312 to a motor controller (not shown) that may be mounted in association with the stator 311 of the motor 310, so as to supply power to the motor 310.

In the embodiments shown, a battery charge indicator 402 may be provided on each foot-deck portion 201 and 202 so as to indicate the charge of the battery pack 400 contained therein. The charge indicator 402 (FIG. 2) may include an activation button 403 (FIG. 2) which is used to control a suitable controller or circuit, and a plurality of LEDs 404 to indicate the battery charge level of the associated battery pack 400.

In the embodiments shown, a lighting strip 500 is provided around the edge of each foot-deck portion 201 and 202. The lighting strip 500 may be powered from the associated battery pack 400 for each of the foot-deck portions 201 and 202. The lighting strip 500 may help to illuminate the vehicle 10 to make it more visible in the dark and as a decorative feature for the vehicle 10.

While not shown, it is optionally possible for one or both of the foot-deck portions 201 and 202 to include one or more secondary wheels that engage the ground G in the event that the rider tips the vehicle 10 forward or rearward by more than a selected number of degrees. By providing such secondary wheels, the vehicle 10 is inhibited from stopping abruptly due to frictional engagement with the ground, thereby permitting the rider to retain greater stability on the vehicle 10. Such secondary wheels may be provided at distal ends of the foot-deck portions 201 and 202. For greater certainty, it will be understood that, even if the vehicle 10 includes such secondary wheels, it may still be considered a one-wheeled skateboard.

A control system 600 is operatively connected to the motor 310 to drive the at least one primary wheel 302 to maintain the vehicle 10 in balance with a rider 12 on board. The control system 600 may include a single controller 602, which includes a memory 602a configured for storing instructions and a microprocessor 602b configured for reading and writing as needed to the memory 602a and for carrying out the instructions. Alternatively, the control system 600 may comprise a plurality of individual controllers 602. The control system 600 shown in the figures includes a single controller 602, which receives signals from a suitable angle sensor 604 for the vehicle 10 that is positioned to determine the angular orientation of the support structure 20 relative to horizontal. The angle sensor 604 may be any suitable type of angle sensor, such as, for example, an accelerometer and/or a gyroscope similar to those found in smartphones. The control system 600 may be programmed to control the current to the motor 310 from the battery packs 400 based on the angular orientation of the support structure 20 relative to horizontal. When stationary, as the rider tips either the forward or rearward foot-deck portion 201, 202 (depending on the direction of travel) of the support structure 20 downwards, at causing the support structure 20 to pivot on the wheel 302, the control system 600 interprets the angular orientation of the support structure 20 as an intention to move in the forward or rearward direction, wherein the speed of the motor 310 is selected based on the angular orientation of the support structure 20. If the rider increases the downward angle of the support structure 20 in the direction of travel, the control system 600 increases the current to the motor 310. If the rider decreases the downward angle of the support structure 20 in the direction of travel, the control system 600 decreases the current to the motor 310. In addition, the control system 600 may be programmed to accelerate and decelerate the vehicle 10 in an attempt to maintain the rider 12 in a balanced state on the vehicle 10 in the fore-aft directions.

The controller 602 may be provided in one of the foot-deck portions 201 or 202. In the embodiment shown, the controller 602 is provided in the foot-deck portion 202, and suitable circuitry is provided inside the motor 310 to permit the controller 602 to control current flow from the battery pack 400 in the foot-deck portion 201 to the motor 310. Alternatively, the angle sensor 604 can be separated from the controller 602 and disposed in the support structure 20, and the controller 602 may be located in the wheel assembly 30 or elsewhere in the support structure 20.

Persons skilled in the art will appreciate that there are yet more alternative implementations and modifications possible, and that the above examples are only illustrations of one or more implementations. The scope, therefore, is only to be limited by the claims appended hereto.

The invention claimed is:

1. A foot-deck-based vehicle, comprising:
   a support structure having a longitudinal axis, a first foot-deck portion, and a second foot-deck portion, each of the first foot-deck portion and the second foot-deck portion having a foot support surface; and
   at least one primary wheel rotationally connected to the support structure for rotation about a lateral axis,
   wherein the first and second foot-deck portions are movably connected at least indirectly to each other and are movable between a use position and a stowage position, wherein in the use position, the first and second foot-deck portions are positioned longitudinally forward and rearward of the at least one primary wheel respectively, with the foot support surfaces of the first and second foot-deck portions being oriented to support first and second feet respectively of a rider thereon, and in the stowage position, a majority of the foot support surface of the first foot-deck portion is in contact with a majority of the foot support surface of the second foot-deck portion.

2. A foot-deck-based vehicle as claimed in claim 1, further comprising a handle aperture on at least one of the first and second foot-deck portions, wherein the handle aperture is positioned to be graspable by a user for carrying the vehicle when the first and second foot-deck portions are in the stowage position.

3. A foot-deck-based vehicle as claimed in claim 1, further comprising a motor that is operatively connected to the at least one primary wheel, and a control system that is operatively connected to the motor to drive the at least one primary wheel to maintain the vehicle in balance with a rider on board.

4. A foot-deck-based vehicle as claimed in claim 1, wherein the primary wheel contains a motor and is rotatable about a motor shaft, wherein at least one of the first and second foot-deck portions is movably connected to the motor shaft.

5. A foot-deck-based vehicle as claimed in claim 4, wherein the first and second foot-deck portions are pivotally connected to each other via the motor shaft for movement between the use position and the stowage position.

6. A foot-deck-based vehicle as claimed in claim 5, wherein both the first and second foot-deck portions pivot about a single pivot axis relative to each other.

7. A foot-deck-based vehicle as claimed in claim 6, wherein the foot support surface of the first foot-deck portion and the foot support surface of the second foot-deck portion are generally planar.

8. A foot-deck-based vehicle as claimed in claim 7, wherein the pivot axis is coplanar with the foot support surface of the first foot-deck portion, and wherein the pivot axis is coplanar with the foot support surface of the second foot-deck portion.

9. A foot-deck-based vehicle as claimed in claim 5, wherein the support structure includes at least one axial member that is parallel to the lateral axis, wherein each of the first and second foot-deck portions has two arms that are pivotally coupled to the at least one axial member.

10. A foot-deck-based vehicle as claimed in claim 9, wherein the first and second foot-deck portions each have two arms that extend to couple to the at least one axial member, wherein a first one of the arms from the first foot-deck portion couples to the at least one axial member laterally outside a first one of the arms from the second foot-deck portion, and wherein a second one of the arms from the first foot-deck portion couples to the at least one axial member laterally inside a second one of the arms from the second foot-deck portion.

11. A foot-deck-based vehicle as claimed in claim 5, wherein the support structure further includes a support structure base that is integral with said one of the first and second foot-deck portions and which extends from said one of the first and second foot-deck portions past the lateral axis, wherein the other of the first and second foot-deck portions is supported against the support structure base when the first and second foot-deck portions are in the use position.

* * * * *